July 14, 1964  E. N. L. ASHTON  3,141,168
STEERABLE TRUNNION MOUNTED PARABOLOIDAL ANTENNA
Filed Feb. 5, 1962  13 Sheets-Sheet 1

INVENTOR:
EDWARD N.L. ASHTON

By Kent W. Wonnell
Atty.

INVENTOR:
EDWARD L. ASHTON

INVENTOR:
EDWARD L. ASHTON

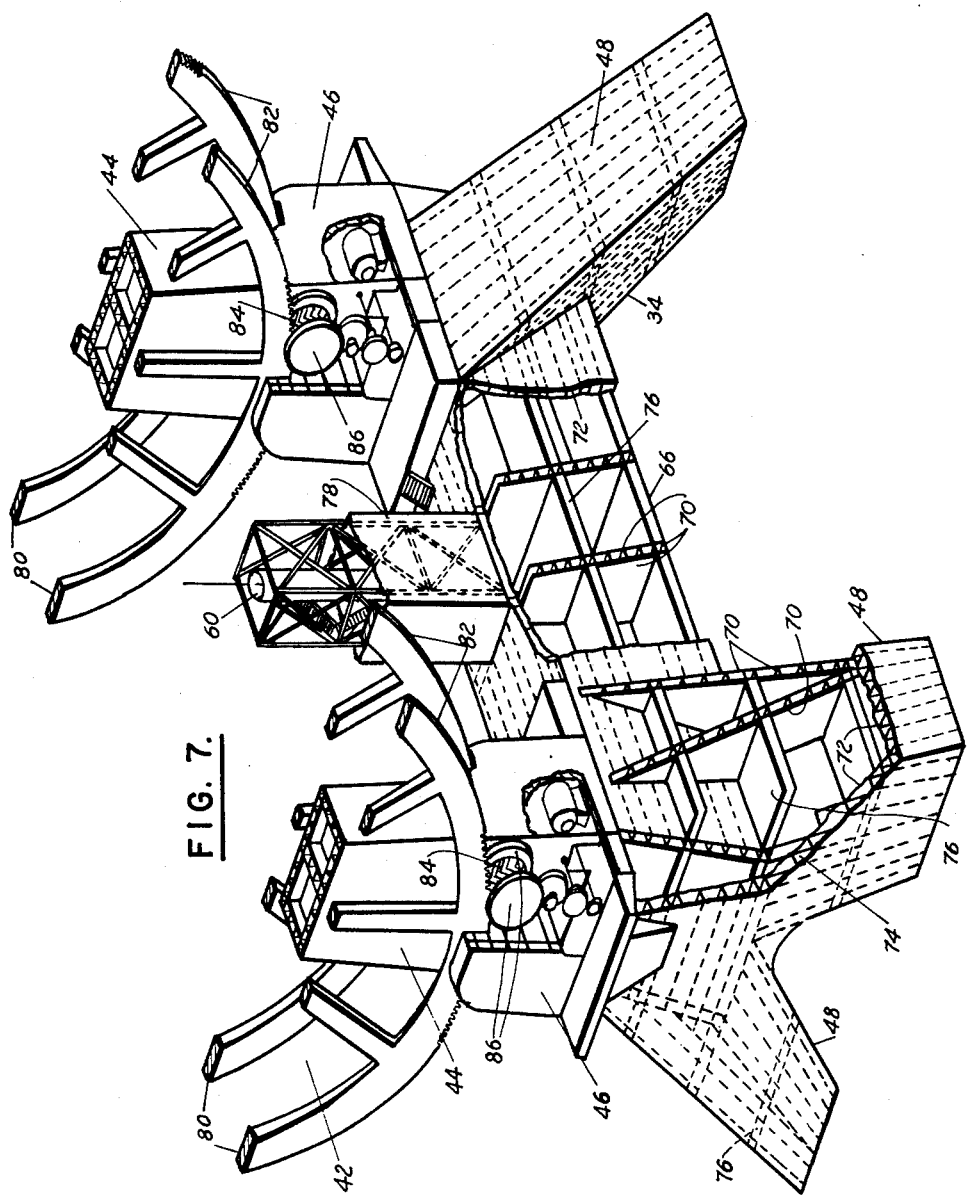

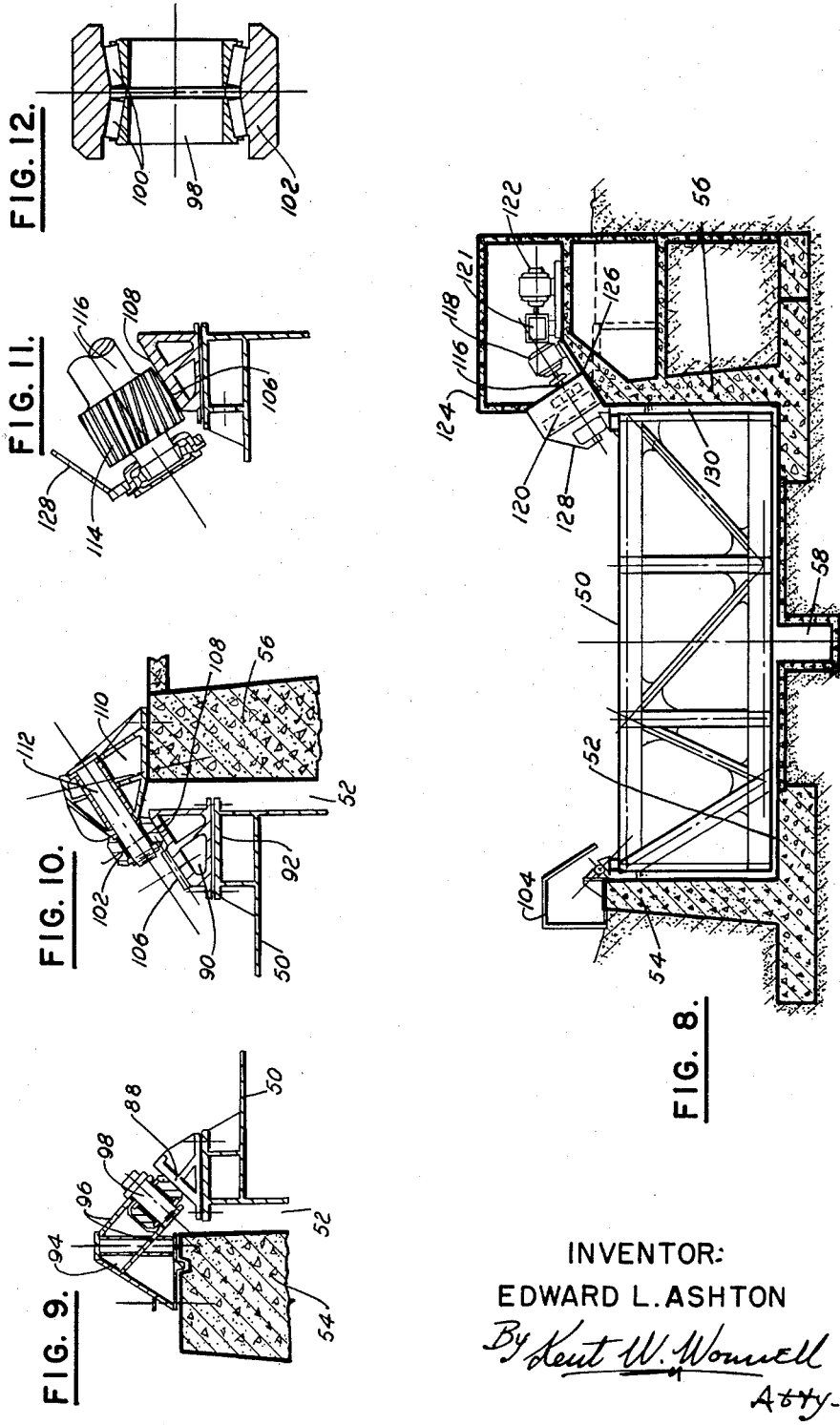

INVENTOR:
EDWARD L. ASHTON

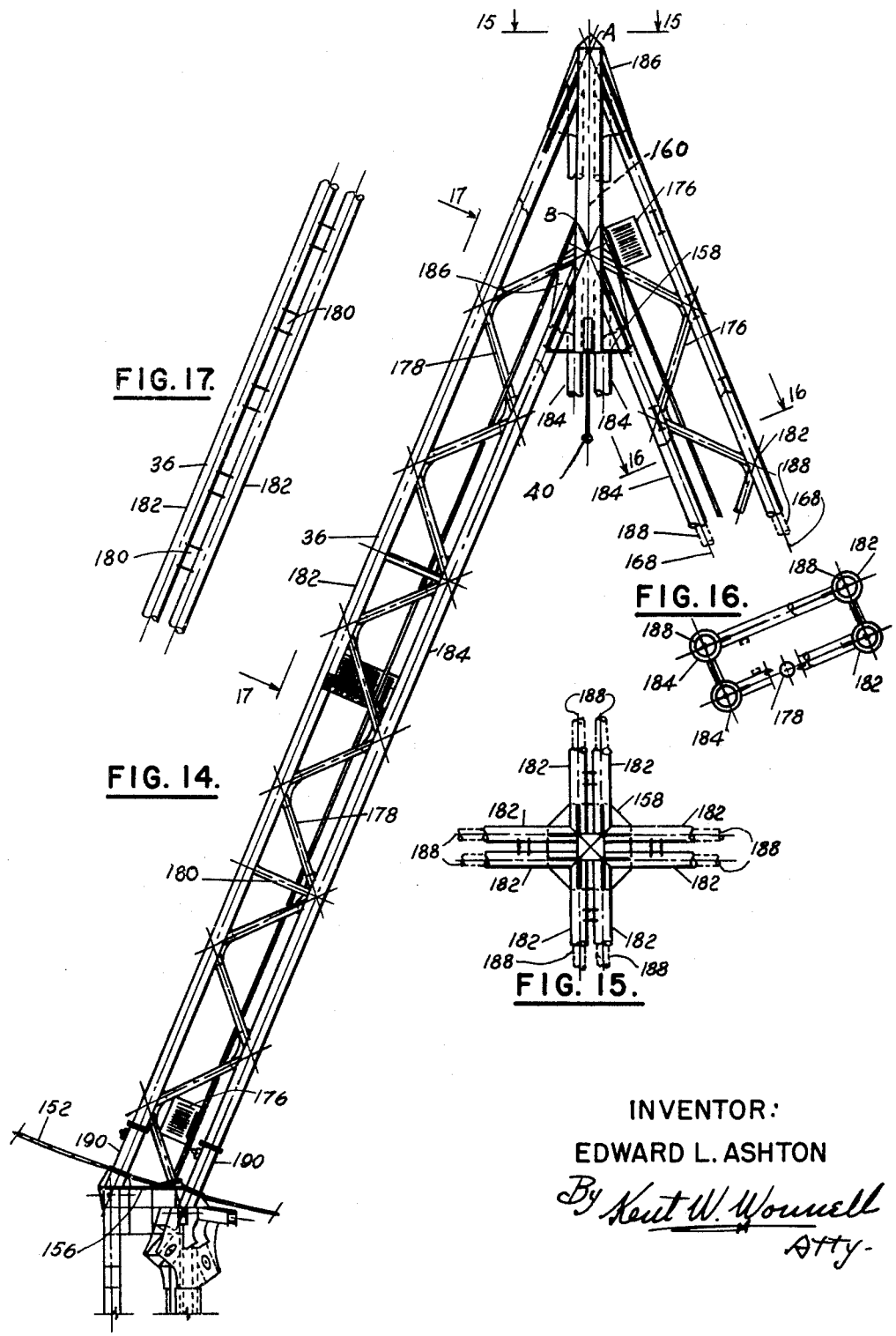

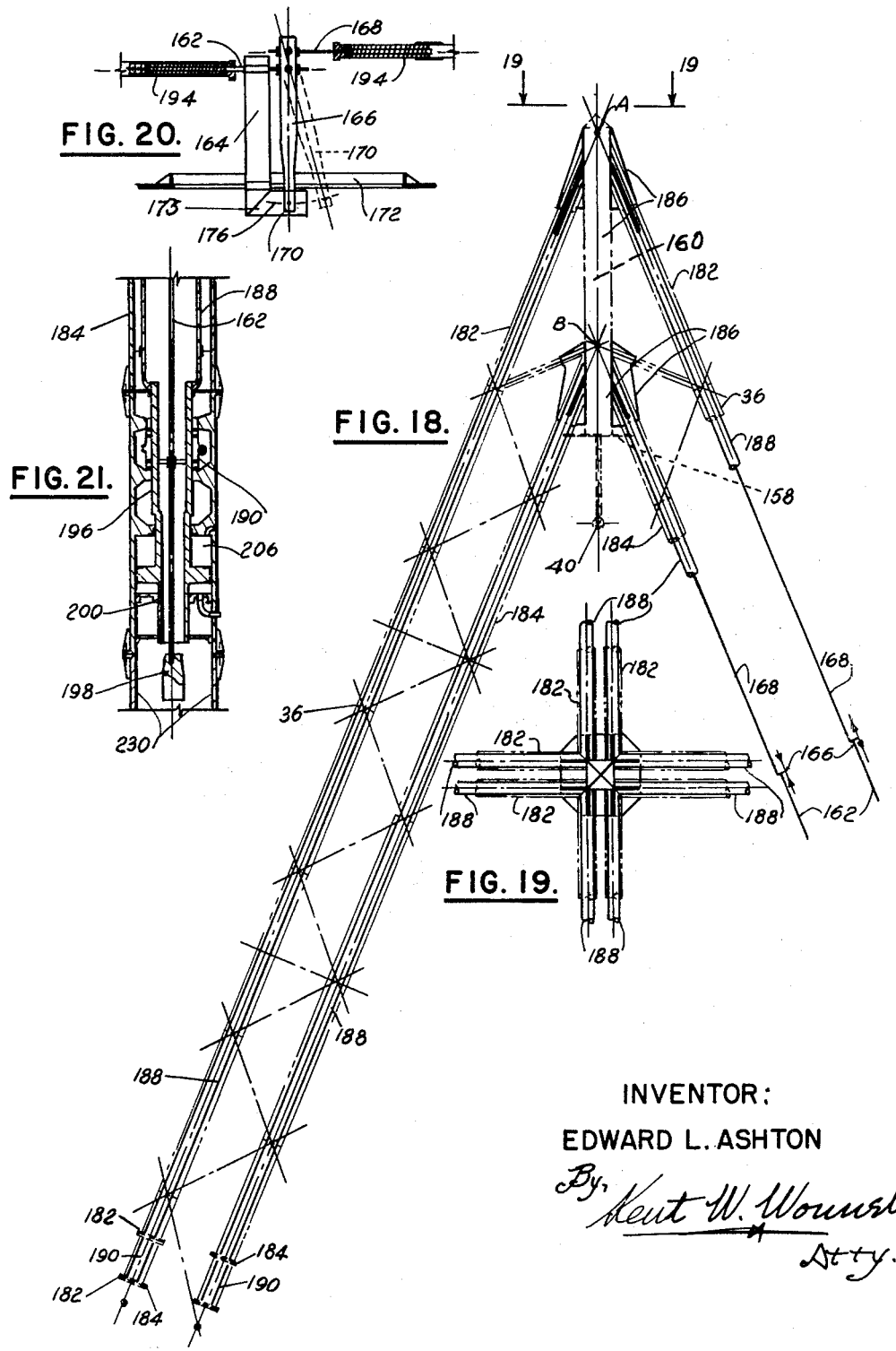

July 14, 1964　　　　E. N. L. ASHTON　　　　3,141,168
STEERABLE TRUNNION MOUNTED PARABOLOIDAL ANTENNA
Filed Feb. 5, 1962　　　　　　　　　　　　13 Sheets-Sheet 11
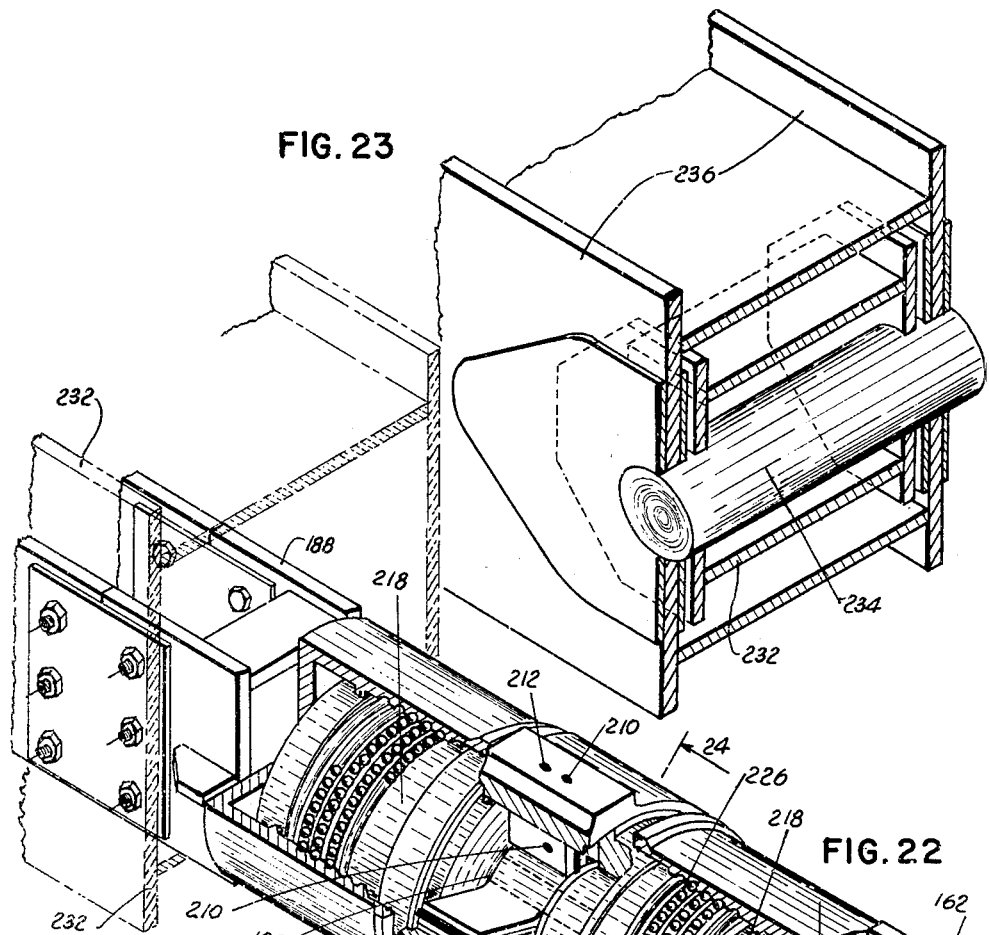
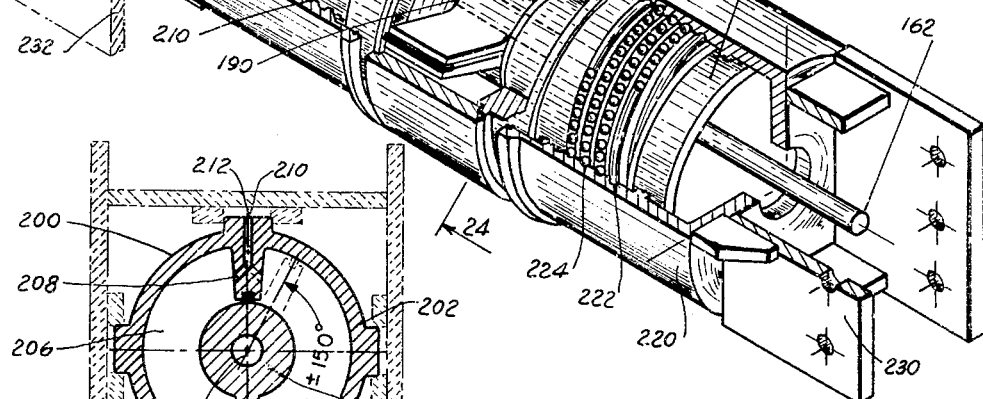
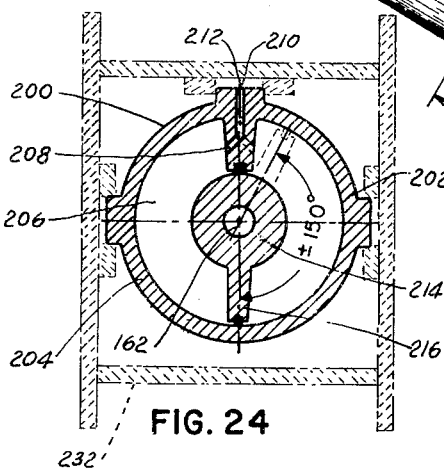
INVENTOR:
EDWARD L. ASHTON July 14, 1964  E. N. L. ASHTON  3,141,168
STEERABLE TRUNNION MOUNTED PARABOLOIDAL ANTENNA
Filed Feb. 5, 1962  13 Sheets-Sheet 12

INVENTOR:
EDWARD L. ASHTON

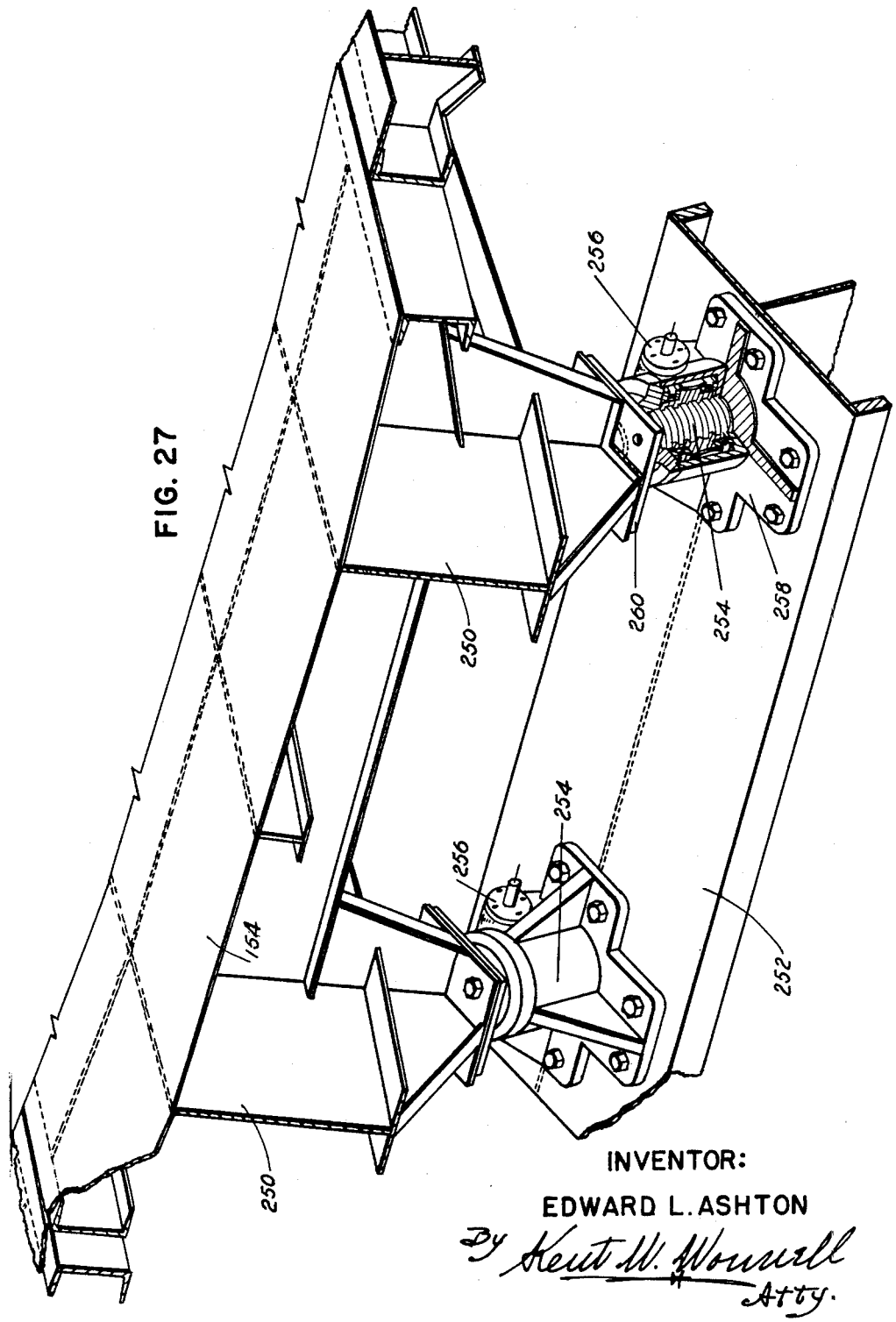

United States Patent Office 3,141,168
Patented July 14, 1964

3,141,168
STEERABLE TRUNNION MOUNTED PARABOLOIDAL ANTENNA
Edward Ned Lowell Ashton, 820 Park Road,
Iowa City, Iowa
Filed Feb. 5, 1962, Ser. No. 171,028
14 Claims. (Cl. 343—709)

This invention relates to a comparatively large antenna and the principal object of the invention is to improve the present systems of radio communication, and counter measures, to extend the range and fields of vision in the related fields of astronomy and astrophysics into unexplored areas by providing a vast increase in the size of aperture that is currently available for use as a precise solid surface short wave paraboloidal radio antenna, and also to provide means and a method for making, mounting and directing the antenna so that it will be capable of being pointed accurately to any point in the sky.

Other instruments in the world either built or under construction, or designed for this purpose, have the common disadvantage that they are much too small to fully develope and explore even the initial possibilities of use for which they are intended. With the largest aperture available, although much too small, the antenna is limited in size both by the best structural rigidity that could be obtained with available materials arranged in the best structural manner, and by the methods that were used to provide support and steer the instruments. When these instruments are made large enough to accomplish the desired result, they could not be made completely movable or steerable, and therefore were unable to track celestial objects long enough or accurately enough for the required periods of observation.

An object of the present invention is therefore to provide a steerable trunnion mounted solid surface, paraboloidal antenna made of structural aluminum with an aperture of three hundred feet in diameter and a focal length of one hundred and fifty feet balanced on a horizontal declination axis on roller or oil pad bearings at the top of a structural steel tower, mounted on a large hydraulic turntable at ground level for movements in azimuth.

A further object of the invention is to provide a steerable antenna of this kind which is movable about a horizontal declination axis, for slightly more than one hundred and eighty degrees and for movement about an entire circle in azimuth, and at a sufficient speed in both of such dimensions that the instrument may readily bet set for automatically tracking celestial objects with great accuracy.

A further object of the invention is to move the antenna about a declination axis or in azimuth with sufficient speed under adverse conditions to withstand heavy winds, up to 200 miles per hour, and to survive as much as 8 inches of ice without major damage.

A further object of the invention is to provide a solid surface parabolic antenna which may be moved in either direction for a full circle in azimuth and through half a circle from one horizon to the other horizon in altitude with full capabilities at wind velocities of about 40 miles per hour and with only slightly degraded accuracies at higher wind velocities.

A further object of the invention is to provide a solid surface antenna of this kind adapted to be used both as a transmitter and as a receiver.

Still further objects are to mount the antenna on antifriction roller bearings forming the altitude axis, and on large hydraulic bearings in azimuth which may be loaded and held down by roller bearings engaging the rim edges of the bearing for stability.

A further object of the invention is to make a parabolic antenna with outer continuous and solid structural plate surfaces and inner spaces between them so that heat can be applied from the inside to remove ice, to dry the plates, and to maintain uniform temperature for geometrical reasons throughout the entire structural frameworks.

Still a further object is to improve the tower and girder structure for the tower for locating the focal axis, which may be erected upon the bearings and the plates for the antenna positioned therefrom in erecting the structure.

A further object is to provide improved compensating systems to be installed in the girders and trusses having either hydraulic ball bearing screw jacks, or worm driven bronze nuts on steel threads with the hydraulic booster cylinders to relieve friction on the bearing threads, or with heating elements applied to the compensating members, and to utilize hydraulic screw jacks instead of mechanical wedges.

A further object of the invention is to provide the main mounting structure with outer girders to form inner living and service rooms therein; to employ a single set of conical rollers and conicals gears for azimuth pressure and drive; and four helical altitude gears each driven by two pinions with steel balance blocks in the rim of the gears so that the driving pinions may be applied directly against the counterweights.

A further object of the invention is to simplify the focal equipment supports by providing two compensated points to line up the focal axis and focal point and to provide a control room adjacent thereto for operating the antenna.

And in general, to provide improved structual methods and apparatus which have the following advantages over previous structures:

To provide an automatic method for compensating the displacements caused by structural deflections and thus to insure a more prefect paraboloidal reflecting surface for the antenna in all positions and all times;

It makes it possible to use much shorter wave lengths over much larger apertures and thus extends the science of radio astronomy and communications into new fields in which the horizon is pushed back a vast distance;

It makes it economically feasible to build giant movable antennas of unlimited size without being hampered by former structural limitations;

It provides a symmetrical support for the antenna at four main points in place of only two supports and thereby makes it possible to deliver the loads symmetrically to four main altitude bearings upon two relatively short shafts in place of reactions upon only two main bearings on the ends of a single very long shaft;

It provides much larger and stronger operating mechanisms both for moving the antenna about the declination axis and for holding it against hurricane winds;

It provides for more perfect geometrical relationship between the location of the focal point and the paraboloidal surface in all positions and at all times regardless of the weight of the focal equipment;

It provides a solid surface for the reflector;

It provides for thermal control of the paraboloidal frameworks from the insides;

It provides a new arrangement of surfacing elements wherein there are many duplications of each piece and wherein all of the exacting work may be prefabricated and accomplished in the shop and then later shipped and assembled in the field without false work at a very great saving in time and money;

It provides a multiple cantilevered system of strength in the surfacing elements whereby each unit is carried from the end of the last unit so that only one new stringer is required for each additional unit and each unit cantilevers beyond the supporting stringer to support the next unit in such a manner that any individual unit may be removed and replaced at any time should it become damaged in the future;

It provides for making the surfacing elements from rolled or extruded sections of much more economical proportions in place of castings and without the need of machine finishing;

It provides for a master controller and position indicating system with direct reference to the permanent ground so that the true position of the antenna is precisely known at all times;

It provides a new kind of hydraulic bearing having foundation capabilities for reactions for unlimited size and for stabilizing the structure under operating conditions with the additional weight of the fixed portions of the foundation itself;

It provides for adjustable shims and power driven jacks for making precise adjustments to meet surface tolerances which may also be used later, either when it becomes necessary, or desirable to increase the precision of the instrument in some special attitude;

It provides the advantage of placing tracks on the barge whereby perfectly true and level bearing surfaces may be generated by turning the bearing and for individual adjustments of the holding down rollers to a perfect fit with respect to the track before they are permanently anchored to the foundations;

It provides that individual wheel loads under maximum overturning conditions are much smaller than required when the tracks are placed on the ground, and thus they do not interfere with the grounding of the whole bearing for survival conditions;

It reduces the turning friction only to that equal to the weight of the stabilizing forces in place of being applicable to the entire weight of the antenna;

It spreads the foundation reactions over the entire area and thus greatly reduces the costs of the foundation by reducing the intensity of the foundation pressures; and It provides a more stable antenna which may be more easily moved and secured for survival conditions.

Other objects of the invention will also be apparent from the accompanying drawings in which, FIG. 1 is a perspective view of a completely fabricated antenna in accordance with this invention, looking into the paraboloidal bowl from one side thereof, and a portion of the mounting base being cut away to disclose the construction thereof;

FIG. 7 is a perspective view of the main cross girder with parts broken away of the top of the structural mounting to show the rooms inside and with fragmentary views of the segments upon which the antenna is mounted for rotation upon a horizontal axis;

FIG. 8 is a sectional view through the floatation chamber and a structural mounting therefor showing also the side connections at an angle for depressing and driving the float;

FIG. 9 is a fragmentary sectional view showing the means for engaging the inside of the float from the top of the cement structure;

FIG. 10 is a fragmentary sectional view of the engaging rack and roller at the outer periphery of the structural mounting for engaging the outside of the float from the top of the cement structure;

FIG. 11 is an enlarged elevational view of the pinion gear engaged in a sectional view of the rack as shown in FIG. 10;

FIG. 12 is a sectional view of a roller with tapered bearings for pressing down on the float as shown in previous FIGURES 5, 8, 9 and 10;

FIG. 14 is an elevational view of one of the focal point mountings and its junction extending upwardly from one point of the antenna surface;

FIG. 15 is a sectional plan view of the structure taken on the line 15—15 of FIG. 14;

FIG. 16 is a sectional view taken approximately on the line 16—16 of FIG. 14;

FIG. 17 is a partial view of the top of one leg structure shown and taken approximately on the line 17—17 of FIG. 14;

FIG. 18 illustrates somewhat diagrammatically the internal stress elements contained within the outer structure as shown in FIG. 14 as applied to one leg of the focal point mounting for the purpose of compensating the geometry at the junctions thereof;

Figures 25, 26:
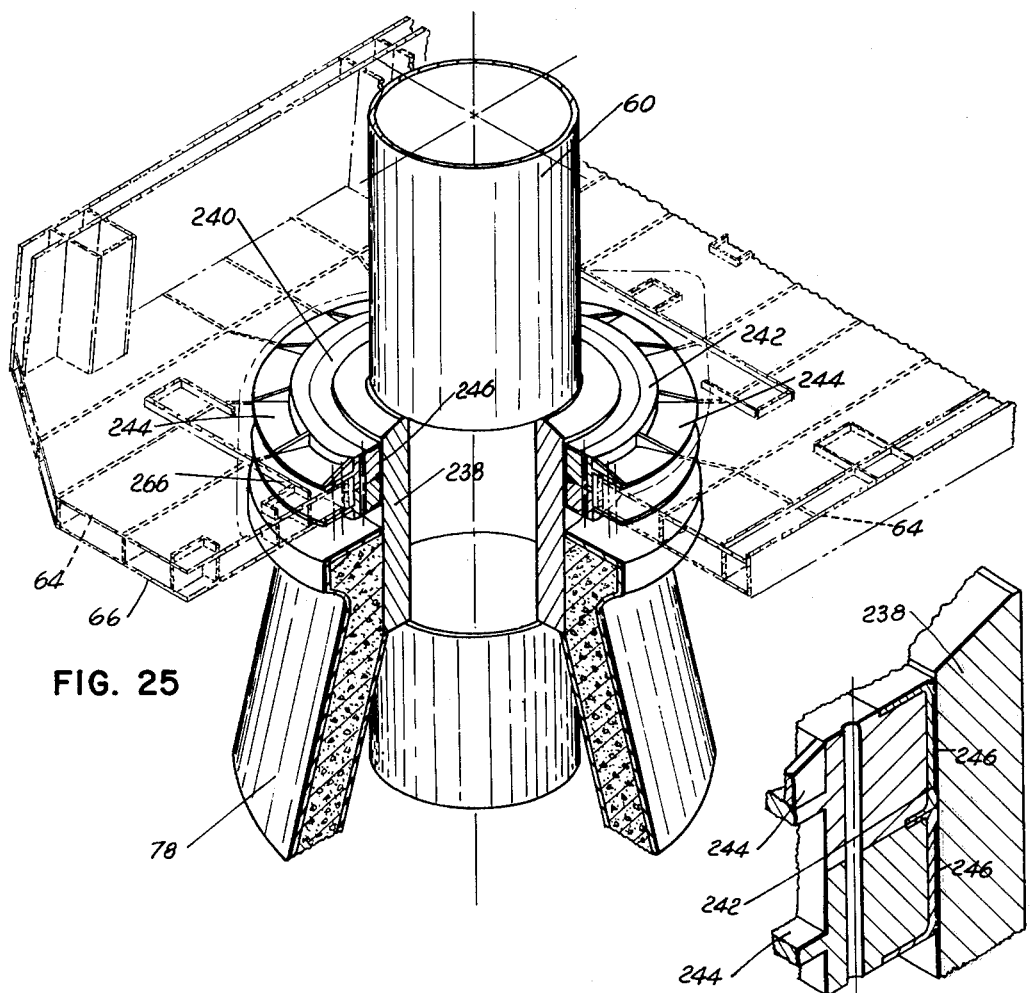

FIG. 19 is a partial plan view of the elements shown approximately on the line 19—19 of FIG. 18; FIG. 20 is a diagrammatic view showing one method of indicating the change in the geometric length of the member; FIG. 21 is a sectional view, somewhat diagrammatic, illustrating a method of applying the compensating stresses to the elements, as shown in FIG. 18;

FIG. 22 is a fragmentary perspective view showing a rotary ball bearing jack arrangement for controlling the stresses in some of the structural members as shown in FIGS. 18 and 21; FIG. 23 is a perspective view partly broken away of one of the connecting pins used to connect the internal and external truss members together at a main structural joint of the truss; FIG. 24 is a sectional view of the hydraulic rotor applicator which is used for turning the ball jack, as taken on the line 24—24 of FIG. 22; FIG. 25 is an enlarged fragmentary perspective view of the centering bearing in the lower portion of the fixed mounting axis of the lower portion of the elevator shaft for ascending the focal point;

FIG. 26 is an enlarged fragmentary perspective view of the bearing surfaces of the construction shown in FIG. 25; and FIG. 27 is a perspective view of a portion of the antenna surface and its mounting with a portion of one of the adjusting rotary driven screw jacks for supporting it.

This invention has many features which are shown in my application for similar subject matter, Serial No. 665,622 filed June 7, 1957, but there are many features of refinement in the construction and operation relating to this antenna as compared with that originally filed, one of the main differences being that the present structure relates to a paraboloidal antenna having about one-half the aperture as the one previously filed, but should not be considered as limited in size, and neither one being limited to any particular kind of material except that it is usual to make the main bearing of structural steel or other suitable material, but to prefabricate most of the other parts of aluminum as shown and described in the present application.

The following features which additionally appear to differ from the original application are mostly specific improvements thereon, and include:

(a) The combination of conical roller bearings with a hydrostatic bearing and a large conical gear for the azimuth drive which improves the precision controls in azimuth and provides for precise manufacturing adjustments during construction;

(b) Hydraulic rotor driven ball bearing screw jacks and other improved systems for automatically compensating the structural deformations such as by means of thermal jacks, and other control thermal characteristics, or worm driven bronze jack nuts equipped with hydraulic boosters;

(c) Double compensated support points for the alignment and location of the focal axis, and for the support in practically unlimited amount of pre-amplifier and focal equipment;

(d) Improvements in the adjustable supports for the surface elements to achieve better surface precision with greater ease of adjustment;

(e) New double declination gearing and counter-weight assemblies with single cellular tower column construction to achieve better strength and mobility with greater sky coverage above the altitude axis with improved pointing accuracy and greater controlability.

(f) In double cellular wall tower and girder construction which makes it possible to construct structural members of unprecedented and unlimited size with greater integrity from relatively thin structural plate components, and with all the interior spaces unobstructed for use and readily available for occupancy and for all of the service building requirements inside, eliminating the need for separate service structures and thus greatly improving the transmitting and receiving facilities for the whole antenna.

In general, all service buildings and supporting facilities are carried within the structure itself because of the huge size of the members that are required anyway, and because the bearing is easily capable of supporting the additional loads. The whole structure is designed to withstand winds of 200 m.p.h. velocity for survival, and up to 8 inches of ice. It should be understood that all of the main structural portions of the antenna are enclosed by means of a solid surface back-up structure so that heat may be applied from the inside to remove the ice, to maintain uniform temperatures, and for geometrical reasons, throughout the entire structural frameworks including the barge and structural towers.

An enclosed platform may be provided at the top of the central control tower for containing the master controller which may be mounted on a stabilized platform at the common intersection of the altitude and azimuth axes, but this particular controlling mechanism is not described in detail as it is believed part of another and entirely different invention not herein shown or claimed.

Referring now more particularly to the drawings, the mechanical tolerances are met by a rugged design also equipped with multiple applications of simple automatic self-compensating structural members within the regular members, designed to maintain constant geometrical relationship within a specified variation in all of the main structural truss systems of the entire antenna and feed supporting systems, under all of the variable operational loading conditions and in all of the operating attitudes of the antenna.

*General Description*

Referring now more particularly to FIGS. 1–6 of the drawings, a solid surface paraboloidal antenna 30 which is represented as some 300 feet in diameter mounted upon a transverse horizontal axis 32 and upon a supporting base 34 which has an overall height of approximately 435 feet, stated merely for the purpose of exemplifying the magnitude of the structure to which this is applied.

Within the antenna is a tower having four legs 36 which extends centrally of the antenna with a controlling station 38 supported at the juncture of the legs and related to a focal point 40.

At the ends of the horizontal axis 32 are two circular segmental bearings 42 at spaced distances apart engaging the rear of the antenna 30 upheld at their axes by bearing supports 44 and engaging driving pinions (described later), in upper base extensions 46.

The supporting base 34 is preferably formed with four legs 48, angling outwardly apart, the lower ends mounted in and supported by a hollow ring 50 which, in turn, is mounted in a shallow floatation 52 having inside and outside structural units 54 and 56 respectively and usually having a circular channel 58 between them for the passage of liquid which may be fed to or removed from the floatation ring 52.

At the center of the base and extending upwardly to the horizontal axis 32 is a tubular member 60 which is variously enclosed above and below the base but provides a passageway for an elevator (not shown), the lower end of which extends downwardly above the surface of the ground 62. At the surface of the ground, an additional ring reservoir or tank 64 may be provided for the liquid supplied to and removed from the floatation ring 52 and for other desired purposes.

These features are generally similar to those of my application Serial No. 665,622 but the detailed construction of these and other parts are varied in the respects hereinafter noted and for the purpose of obtaining added and improved results.

Figure 4:
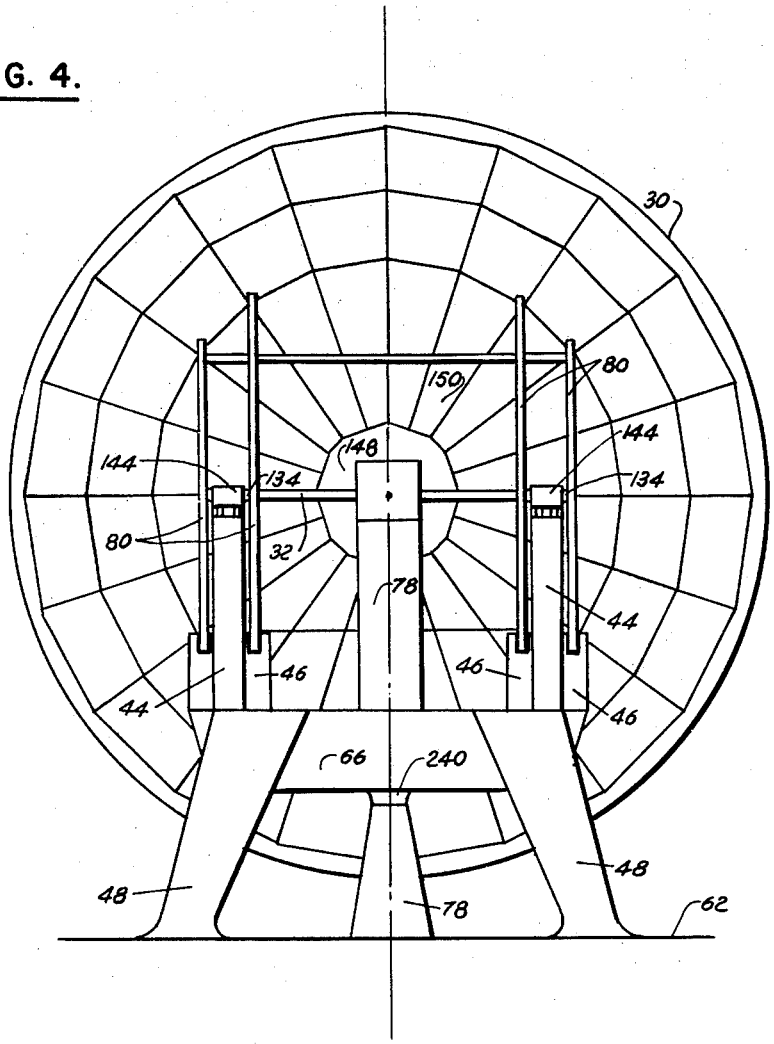
FIG. 4 is a full rear elevation of the antenna, substantially in one lowered declination position, but not including the azimuth rotational mounting.

In FIG. 4, it will be noted by the broken lines that the antenna 30 may be turned in opposite directions and its longitudinal axis inclined slightly downward from the horizontal axis 32 so that the antenna is capable of being moved slightly more than 180° from one horizon through zenith to the other horizon and with unlimited rotary motion in either direction for the full 360° in azimuth and with a high degree of pointing accuracy in any direction in which the antenna is turned.

In construction, the tower legs 48 are first erected upon the float comprising the hollow ring 50 with a cross beam 66 connecting them at the top, and the base extensions 46 containing driving means are erected at the tops of the hollow leg structures. The legs of the tower 36 and the segmental bearings 42 may be erected above the cross beam 66 including a horizontal shaft 68 which is located upon the horizontal axis 32 and ordinary bridge type erection derricks may be placed on top of the antenna legs and the other parts placed in proper positions in the other portions of the antenna.

*The Base*

The base 34 as shown in FIG. 7 comprises massive legs 48 each comprising a built-up structure of outer steel plates 70 preferably connected as by welding them together and inside plates 72 connected and suitably spaced apart by struts 74. The partitions of the cross beam 66 may also be formed in a similar manner, and both the legs and the cross beam are spaced and connected to strengthening floor plates 76 which may limit and define the space for large rooms to be used for various purposes in connection with the antenna.

Disposed centrally between the two bearing supports 44 which may also be constructed of plates forming hollowing chambers is the tubular member 60 which preferably forms an elevator shaft which is also similarly contained in a structural assembly 78 of plates suitably welded together.

*Declination Drive*

Each of the segmental bearings 42 is preferably composed of two separate segmental members 80 located on opposite sides of its bearing support 44, the outer peripheral edge of each member 80 having gear teeth 82 engaging corresponding teeth of pinions 84 each having larger discs 86 at the sides for embracing the outside edges of the individual segmental members 80 by means of the gear teeth 82 thereof and maintaining driving contact therewith. The pinions are mounted upon shafts extending into the bearing supports 44 and operated therefrom as hereafter set forth.

Horizontal Drive

Figure 5:
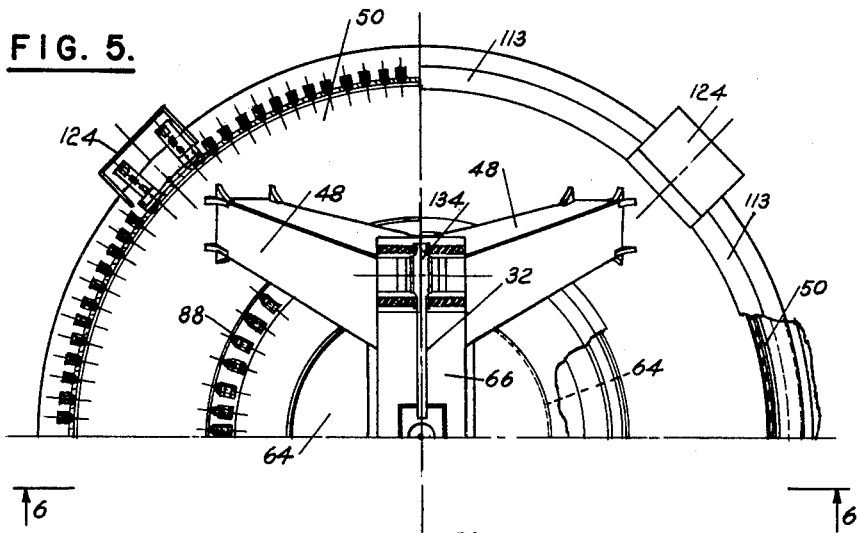
FIG. 5 is a plan view of half of the azimuth mounting with portions broken away for additional clearness and including the lower portion of the antenna mounting.
Figure 6:
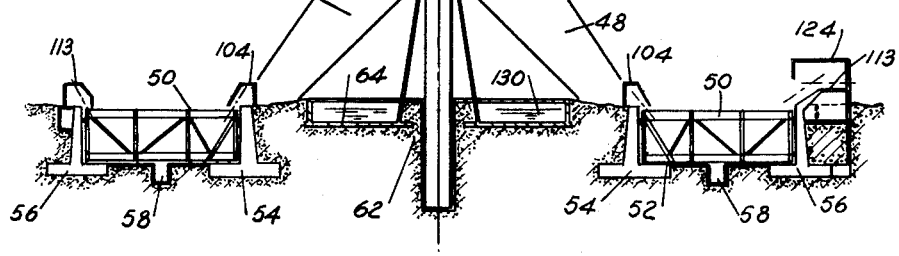
FIG. 6 is a cross sectional view of the structure shown in FIG. 5 as taken approximately on the line 6—6 of FIG. 5.

The hollow ring 50 and its driving pinions 114 are shown more clearly in FIGS. 8-12 inclusive and includes a number of inclined circular sectional contact supports 88 mounted about the upper inner edge of each hollow ring 50, together extending about the entire inner edge as represented in FIG. 5 and also a number of circular section gear supports 90 having a raised mounting around the outer edge of the hollow ring as shown more clearly in FIG. 10, the gears in these supports extending entirely around the outside of the hollow ring. At the top of the inner structural unit 54 are closely spaced brackets 94 having a downwardly and inclined supports 96, each including a pivot 98 for inclined anti-friction bearings 100 to carry a contact ring 102 (FIG. 12) which is at the proper inclination and angle to engage the contact supports 88 mounted on the float and to roll freely thereon. These contact members limit the rise of the hollow ring 50 and stabilize the ring in its movement in the floatation ring 52. Extending over the brackets 94, the pivots 98 and extending partially over the contact rings attached thereto as well as the contact supports are housing shields 104 to protect them from the weather.

The gear support 90 has an arcuate and inclined face gear 106 and also above it, an inclined contact face 108, each gear face 106 and contact face 108 extending entirely around the upper and outer edge of the hollow ring 50.

At the top of the adjacent outer structural unit 56 are a number of mounting brackets 110, each mounting a shaft 112 at a downward inclination extending over the edge of the hollow ring 50 and at the outer end of the shaft is a contact ring 102, similar to the contact ring on the pivot 98 at the opposite side of the hollow ring, and the inclination of this shaft 112 and of the surface of the contact ring 102 mounted thereon engages the contact face 108 of the gear support 90.

A common housing ring 113 is provided to extend over a number of gear supports 90 and mounting brackets 110 to protect them from the weather.

These mounting brackets 110 are placed relatively close together extending around the outer periphery of the hollow ring 50 but at intervals between them at each 90° as indicated in FIG. 5, there are two driving units as shown at the right end of FIG. 8, each having a gear or pinion 114 mounted at the end of a shaft 116 which is inclined outwardly and downwardly so that the gear 114 meshes with the teeth of the face gear 106 on the hollow ring 50. This shaft 116 extends upwardly to a hydraulic motor 118 through a reduction gear 120 closely coupled to a pump 121 and to another driving motor 122 as necessary. These driving gears are preferably mounted in a housing structure 124 built over and upwardly from the outer structural unit 56 and preferably enclosing two driving motors for rotating the antenna about a vertical axis in either direction to cover a whole circle of 360°. The motors 118, 122 may be connected together for operation in unison to effect this movement of the antenna automatically or manually in accordance with the control circuits.

The floor of the housing at the top of the outer structural unit 56 preferably as an inclined portion 126 at the same angle as the shafts 112 and 116, and the portions of the shaft 116 and gear 114 which project over the edge of the hollow ring 50 inwardly from the housing 124 preferably have separate protecting shields 128.

Thus the hollow ring 50 is limited in its extent of rise both at the inner and outer peripheries, and adequate driving connection is afforded with the outer periphery of the ring through the driving motors, and the floatation ring may be stabilized by floating it upwardly in the ring 52 to engage the contact rings 102 at both sides of the floatation ring 50. An accurate contact is maintained for the arcuate face gears 106 which make up the complete driving connection for the hollow ring and the contact and gear surfaces of the supports 88 and 90 may be made more accurate by rotating them with respect to machine elements fixed on the inner and outer structural units 54 and 56.

With this construction, any water 130 may be directed into the circular channel 58 at the bottom of the floatation ring 52 and thence to the ring itself for raising the hollow ring 50 against the contact rings 102 at the sides of the floatation ring thereby stabilizing the hollow ring 50 and causing it to turn smoothly by the operation of the motors 118 and the pinion 114 driven thereby. In extreme conditions, the water 130 may be drawn out of the floatation rings 52 so that the hollow ring 50 will rest upon the bottom thereby preventing the antenna from being rotated about a vertical axis.

Antenna Mounting

Figure 13:
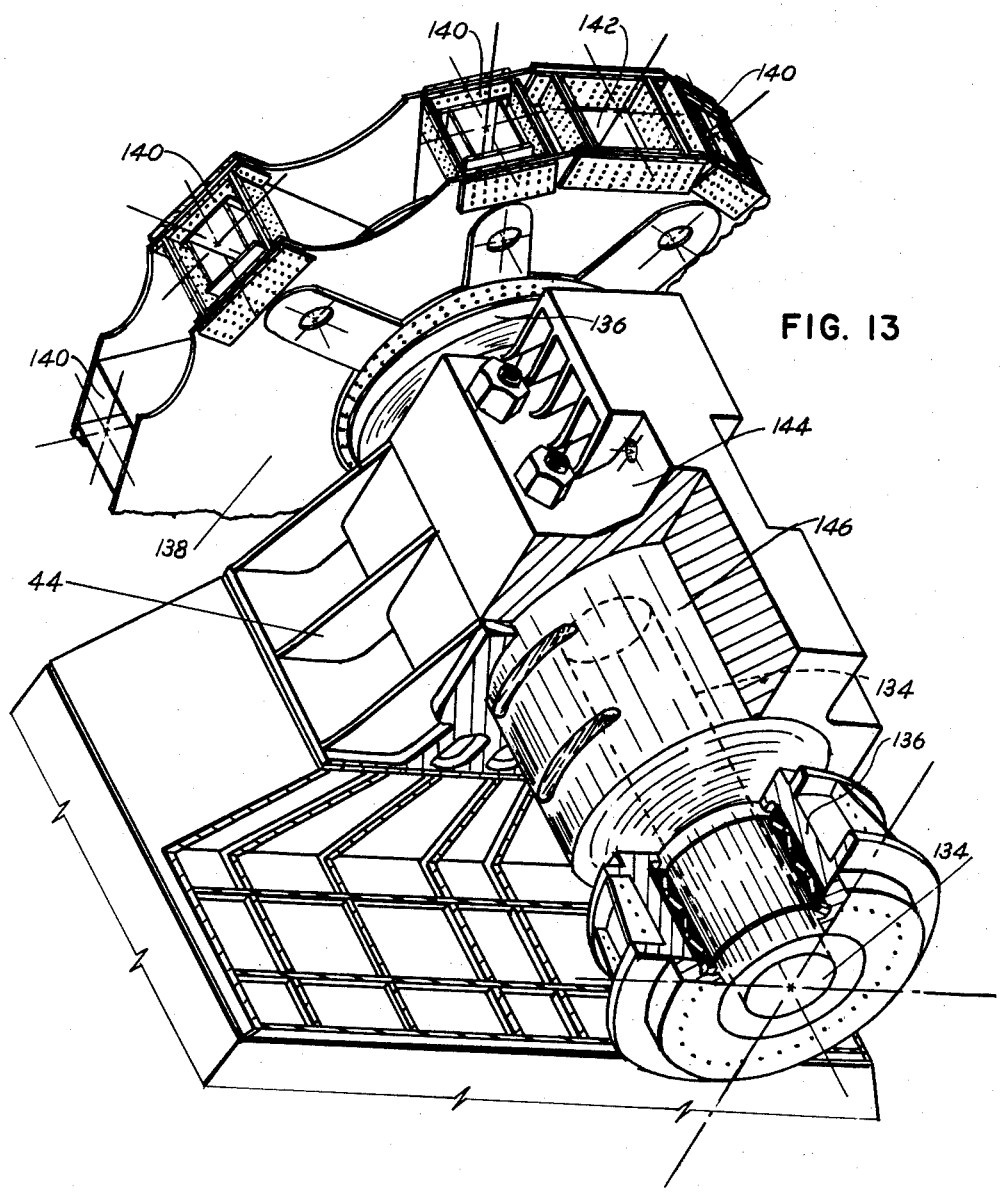
FIG. 13 is a fragmentary perspective view of the top of one of the structural towers showing the supporting shaft and hubs of the large gears for driving the antenna pivoted in its mounting.

By this arrangement, the whole antenna 30 is mounted upon the segmental bearing 42, four members as shown which are simultaneously driven to control the movements of the antenna about the horizontal axis 32, the driving and balancing forces are applied at eight points around these bearings by pinions 84 (as shown in FIG. 7) in connection with the gear teeth 82 at each side of the bearing supports 44, and on the main bearings 132 as shown fragmentarily and in some detail in FIG. 13.

Since the antenna and the legs 36 of the tower are supported at the segmental ends of the bearings 42, the forces are applied at eight points around a circle of the main axis of the antenna, so that all of the winding inertia loads, the reactions from the drive system, and from any counter-balancing, find their forces well distributed in the supporting superstructure of the antenna, to hold all deflections to a minimum.

The entire antenna is thus supported on relatively short shafts 134 preferably located one at each side 80 of the bearing support 44 and by four large anti-friction bearings 136 each located in the hub 138 of the segmental bearing 42. This system is stronger and more rigid than proposed for any other antenna before and it maintains the required tolerances for precision in a very definite and forthright manner.

Each of the bearing hubs 138 of the segmental bearings 42 as shown in FIG. 7 has a number of structural radiating arms 140 for connection to the outer segmental driving members 80, and between any two of the structural arms 140 is a structural arm for constituting or carrying a suitable counter-weight for each of the segmental bearings 42.

These short shafts 134 are comparatively large in size and they are mounted in the anti-friction bearings 136 on top and projecting to each side of bearings support 44 preferably having a large removable bearing plate 144 for access to a bearing 146 and its short shaft 136.

Tower Connections

Figure 1:
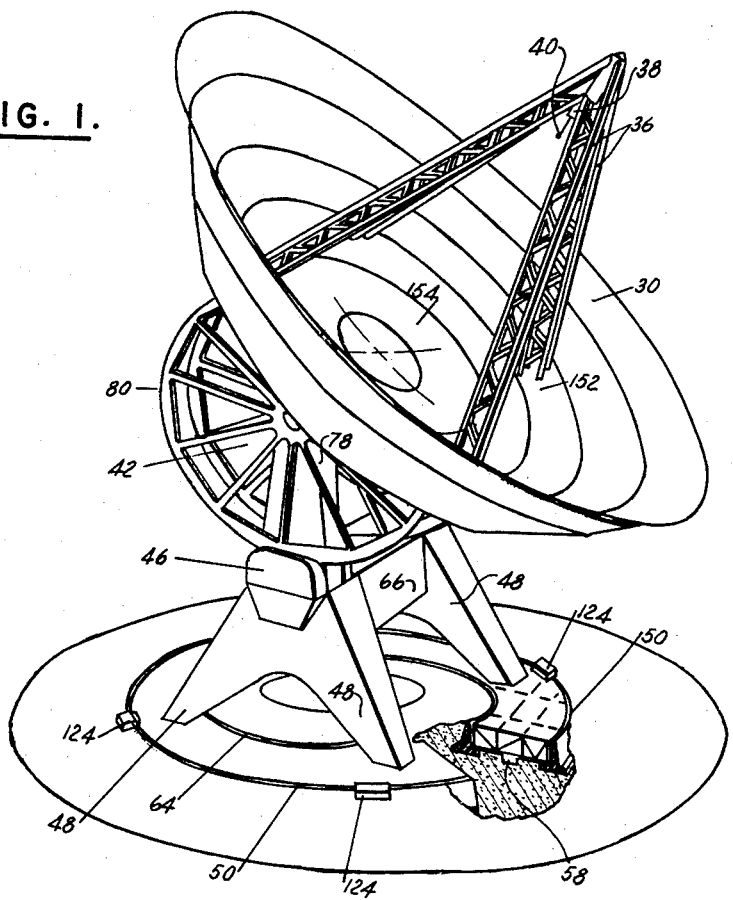
Figure 2:
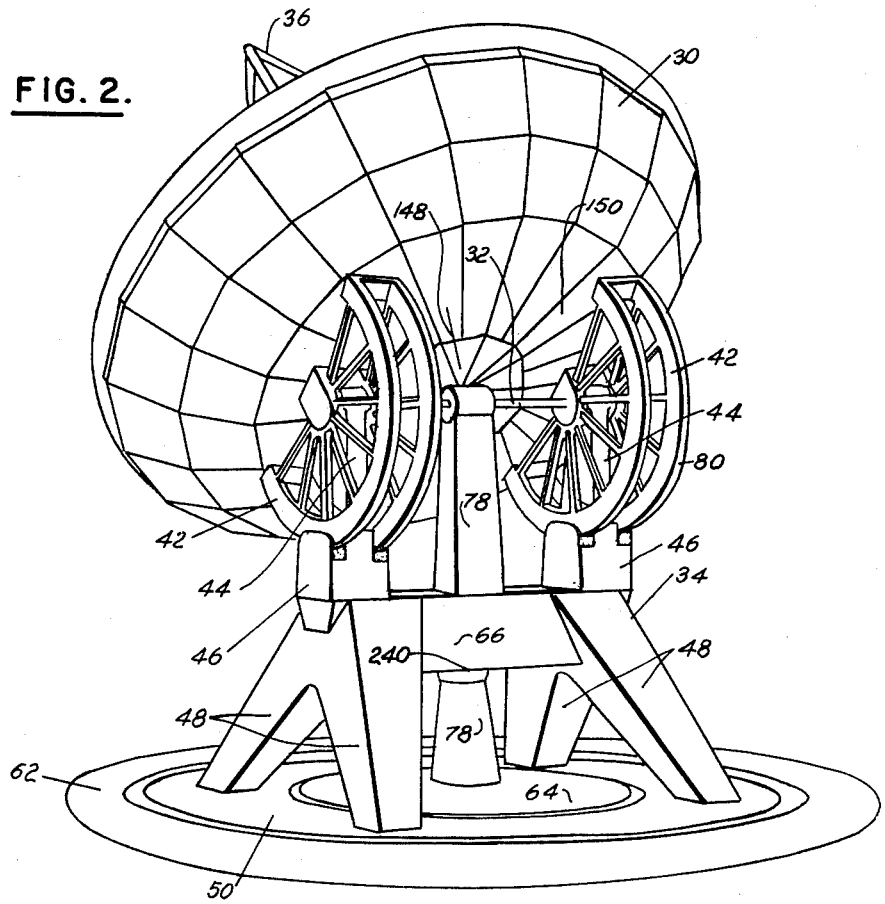
FIG. 2 is a perspective view of an antenna as shown in FIG. 1 but taken oppositely from the rear of the structure.

Directly over the bearings as shown in FIG. 13, a radial truss (not shown) also extends completely over to connect the ends of the segmental bearings 42 and has a double plane compensated truss covered by outer plates 148 and 150 of the antenna 30 as shown by FIG. 2 and by inner plates 152 and 154 shown as concentric circles at the inside of FIG. 1. These bearing trusses are connected together and to a ring truss 156 as shown in FIG. 14 to which each inner end of a tower leg 36 is also rigidly connected around or through inner plates 152, as shown more particularly in FIG. 14 so that the tower legs are each supported by the ring truss 156 which extends around between the inner and outer plates of the antenna 30 at the inner end thereof, with the end of each tower connected approximately to one of the two ends of each segmental bearing 42, thus making a separate rigid connection at the lower end of each tower leg with the upper end of each of the segmental bearings.

The tower legs 36 are inclined upwardly together and are joined to provide a focal support just below their junction with means identifying a focal axis 160 depend- the junction of the tower provides a focal support 158 This focal support 158 is a relatively large structure and preferably contains operating and controlling means for the antenna, which forms no part of the present invention, but points out that the cross section of the legs 36 and the junction of the tower provides a focal support 158 of considerable magnitude so that there is plenty of space to receive and contain all of the controlling and supervisory circuits for operating any motors for driving the antenna itself, and if desirable, for controlling the deformation of the trusses, and the operating parts thereof.

*Compensated Trusses*

The radial trusses between any major parts of this antenna are so large that truss controls may be easily provided and housed entirely in the trusses, the tower legs and other parts of the structure increased with my first paraboloidal antenna application above referred to in which it is pointed out that certain particular means are provided for automatically maintaining the geometrical formations and the exact shape of the antenna by providing a controlling force between the ends of the members, to elongate or to contract the compensating members and trusses automatically, and sometimes in advance of a condition requiring correction.

This invention which differs from other previous methods of support for the focal feed systems, provides as graphically shown in FIG. 20, for triangulating two points as A and B on the focal axis at the top of FIG. 18 out beyond the focal point 40 in place of only one, and thus establishes the alignment of the axis as well as the support for the compensated geometrical location of the focal feed systems as graphically shown in FIGS. 14–20.

The regular trussed supporting frameworks that constitute the four tower legs of FIG. 1 and FIG. 3, as shown in the later FIGURES 14–17, each of the four tower legs consists of two outer chord tubular members 182 interconnected at intervals by transverse struts 180 extending at the bottom from the main ring truss 156 to the point A and of two inner chord tubular members 184 extending from the vicinity of ring truss 156 to the point B and with both chord members 182 and 184 interconnected together in pairs by means of inclined struts 178 to form tower legs 36 with adequate strength and rigidity for the structural requirements without any other extraneous bracings.

Compensating tubular members 188 extending from the main ring truss 156 to the point A and with inner tubular members 184 extending to the point B are represented for example, in FIGS. 18–21. Each compensating member 188 is made in two parts separately attached but rigidly together with tubular members 182 and 184 at the end points A and ring truss 156 or to B and ring truss 156 by means of common conection gusset plates 186 or to cross pin bars 234 as shown in FIG. 23 and with the individual free ends connected together by means of ball bearing jacks 190 as shown in FIGS. 21 and 22.

Thus by operating the jacks on internal compensating tubular members 188, they work against the external members and simultaneously against the same forces as would otherwise be resisted only by the tubular members 182 or 184, and thereby they can share the external loads and alter the elastic length of the external members as required to maintain correct and constant geometry in the truss system.

The geometry of the system is controlled separately for each individual compensating member 188 by means of its own rod measuring system consisting of one compensating shaft 162 and another compensating shaft 168 also rigidly attached together with tubular members 182 and 188 at the end points A and plate 156 and B and 156, and also attached together at the mid-point by a magnifying lever arrangements as shown in FIG. 20 which activates a micro switch in one manner or the other to provide power for rotating a jack 90 in one direction or the other.

These sensing rods or shafts 162 and 168 resist no external forces of any kind except their own gravity loads and serve only to activate the micro switches (not shown). The micro switching devices are usually placed at the mid-point of the jacks and members so that the gravitational forces cancel out and thus the geometrical deformations caused by external forces are the only ones which activate power to the jacks 190 to apply the compensating forces in the tubular members 188.

This is graphically shown in FIG. 28, one rod or shaft 162 carrying an angular fixed support 164 for fixed contacts of the power switches and also supporting a fulcrum of lever 166 while the other actuating rod or compensating shaft 168 is connected to the short end of the lever 166 adjacent the connection of shaft 162, with the result that the other end 170 of the lever has a readily measurable movement with respect to the support 164, and the lever also functions as the moving contact of a power switch. Any deflection of the end 170 of the lever 166 is shown by the arc 174 on an angular portion 173 of the fixed support 164 and this indicates the displacement of the point A with respect to the ring truss 156 or of B with respect to this ring truss as the case may be. This clearly shows any deflection of the points A or B which may be caused by differential pressures or thermal changes of the tubular members 182 and 184, and thus may automatically make the corrections.

*Compensating Members*

This, then, is an accurate means of showing the deflection of the geometrical system of any truss, the trusses themselves are adequate in dimensions to completely house both the sensing rods and the compensating members therein, free from any interference or contact with the weather. In FIG. 14, for example, the compensating members in the rods or shafts 162 and 168, as shown in FIG. 18 are contained within members 182 and 184 and extend throughout the length of the legs 36 of the tower which may also have inclined braces or struts 178 and transverse struts 180 as shown in FIG. 17.

Each leg of the four-legged tower truss consists of four relatively large tubular members 182 and 184 usually spaced with about 5 foot centers on one side and about 14½ foot centers at the other side. The center space between these tubular members is kept open on all four legs for elevator service, the elevator cabs (not shown) to run between the surface of the antenna dish at the back of an outer mounting plate 148 as shown in FIG. 2.

The four main supporting legs 36 extend above and are all rigidly connected together by means of gusset plates 186 or other suitable fastening means to which the leg struts and the tubular supports may also be anchored.

This is represented by the radiating connections as shown in FIG. 15 and FIG. 19 and in the apex below and between the legs is the floor of the focal support 158 from which the focal axis 160 is suspended.

Each of the compensating members comprises a smaller tubular member 188 located within the tubular members 182, 184, and they extend the full length of each leg 36 of the tower without any connections other than at the top and bottom ends connected to the same joint excepting the jacks 190 are incorporated integrally into these compensating members for the purpose of correcting any axial deformations that tend to occur in the lengths of the outer members. These jacks may be activated by micro-switches (not shown) mounted on the angle portion 173 and connected between the ends of tubular rods (like the shafts 162, 168) that measure the distance that has to be held constant within the ends of the regular leg members. Invar steel is used for shafts 162 and 168 so that thermal variations will also be corrected automatically (FIGS. 22 and 24). These shafts 162 and 168 are rigidly fastened to the working points at the top and at the lower end to the structural parts under the base of the jacks 190 and are connected together at locations by loading spring device 194 (as represented in FIG. 20). The springs are provided in the sensing rods so that relatively large movement can occur between the free ends of the rods 192 without causing any damage when the compensated jacks might be turned off, as at the time during a survival condition, and in hurricane winds. The sensing rods 168 are only for the purpose of originating a signal that will activate the jacking mechanism and to give information whether the correcting force should be tension or compression to bring the sensor back to zero as represented by the zero position of the arm 166 in FIG. 20.

Thus if the outer shell 182, 184 stretches or elongates as it will at times on the top side of the antenna, the jacks reacting between the support points, through the compensating tubular members 188 will apply sufficient tension to restore the original lengths, whereas those on the lower side will be applying compressive forces to correct deformations that would shorten the lengths of the outer tubular members 182, 184.

The members of the jacks 190 actually must be capable of resisting all of the variable forces throughout a complete cycle that varies from a maximum value of compression through zero to a value of tension, as the antenna moves 180 degrees in declination about the horizontal altitude axis.

Hydraulic Compensator

In my previous application, above referred to, various types of sensing rods and compensating members are connected as jacks to the tubular members as represented more or less diagrammatically in FIG. 21. The sensing shaft or rod 162 is at the center of a smaller compensating tubular member 188 which is enclosed in a larger tubular member 184 with a jack 190 connected at one extremity and between the outer tubular members 184 and a tubular member 196 with terminal means 198 for anchoring the sensing rod to an end fitting.

Hydraulic operating means are shown diagrammatically by this figure and also in more detail by FIGS. 22, 23 and 24 in which a hydraulic tensioning device 200 is shown. This device comprises semi-circular cylindrical members 202 and 204, the former of which has a partition which, when placed together, form a substantially circular chamber 206. This chamber is suitably closed at the ends and contains a partition 208 attached to one of the members as 202, but having pipe connections 210 and 212 at the outside, one extending to one side of the partition in the chamber, and the other extending to the other side. Rotatably and concentrically mounted in this chamber is a rotary piston 214 having a central power supply activated by micro switches as required by the sensing rods 162 and a projecting vane 216 which makes and closes a wiping connection with the interior of the chamber 206 at the same time the central portion of the rotary piston 214 makes and closes a wiping connection with the end of the partition 208.

Thus it is seen that depending upon the direction in which fluid under pressure is admitted to one of the pipe connections 210 or 212, and correspondingly released from the other, the piston and its vane 216 will be rotated in the chamber 206 about 150° or more in one direction or the other from a central position.

This movement of the piston 214 is sufficient to apply or release pressure upon the compensating tubular member 188 and thereby applying it to the truss member 184 to which they are connected. For the purpose of providing a jacking movement for each of the sensing rods, a rotary jack 218 is mounted at each side of the hydraulic tension device 200 and comprises an outer cylindrical member 220 usually about the same diameter as the hydraulic chamber having spiral grooves 22 in its inner surface engaged by bearing balls 224 in corresponding spiral ribs 226 of a rotary bearing member 228, the rotary jacks 218 at opposite sides of the hydraulic tensioning device 200 being turned in opposite directions to receive the corresponding movement imparted to it by the intermediate hydraulic tensioning device.

One end of the sensing rod is represented as connected to a structural plate 230. The whole hydraulic tensioning means is enclosed in a specific truss 232 in dotted outline in FIG. 24 and FIG. 23 illustrating a cross bar 234 rigidly connected at the ends and extending through the sides of truss plates 236 and forming a connection to which the terminal means 198 shown in FIG. 21 is anchored at the end of one of the sensing rods.

The rotary jack devices 218 are reversed end for end so that the movement of the hydraulic device 201 causes a truss elongation in one direction, and relaxation upon the compensating member 188 in the other direction.

Azimuth Centering Bearing

A vertical bearing for accurately centering the movement of the antenna in azimuth is shown in FIG. 25 located at the center of the main cross girder 66 (see FIGS. 1–4) and supported by means of a reinforced concrete foundation tower built integrally with the water storage reservoir ring tank 64. This bearing functions as a precision center for the final setting of the arcuate azimuth gear supports 90 and roller bearing contact supports 88 and contact face 108 on the bearing ring 50, and likewise as a fixed reference tower to the ground for the precise measurement of all angular motions of the antenna above this azimuth axis.

For this purpose, a large pintle bearing structural ring 238 projects upwardly from the top of the tower structural assembly 78 forming also a vertical shaft about which a bearing in the form of a concrete base 240 rotates as the antenna is turned in azimuth. This base or bearing 240 as built integrally into the bottom flange of the cross girder or brace 66, consists of bronze bearing sills 242 (FIG. 26) with oil pad reservoirs 246 which constitute the moving surfaces of the bearing and deliver the centering pressures from supporting bearing members 244 to the structural pintle ring 238 as the members 244 transmit the pressures simultaneously to structural components 266 of the cross girder or brace 66 and thence to the loads on the antenna.

In this device, the directions are so vast that the interior of the tower structural assembly 78 and the pintle bearing 238 is likewise large enough to function as an elevator shaft 60 as required to carry employees from ground level and below to all levels within the cross girder or brace 66, and to the horizontal indicating systems and recording wave guides located at the level of the declination axis 62.

Walks are also provided between the upper ends of the elevators and the bottoms of the tower legs, and the latter may be separately provided with elevators, and other walks (not shown) but which are commonly applied in a well known manner.

The bottom end of the tubular member 60 may be supported by the structural ring 238 which has an entrance to the tube and to the elevator. This ring is in turn mounted in a concrete base structural assembly 78 extending through and beyond the ring tank 64 which may be secured thereto, if necessary.

Other entrances are provided through the tubular member 60 for housing the elevator, but form no part of the present invention and therefore are not illustrated in detail.

Antenna Surface Supports

A partial segment of one of the surface panels of the antenna, which is represented in FIG. 27 as having inner plates 152 together with supporting and spacing beams 250, the supporting structure has a cross beam 252, and rotary jacks 254 each operated by a motor 256 so that by rotating the movable portion of the jack against its end plates 258 and 260 supported by the cross beam 252 and the spacing beam 250 respectively, the location of the surfaces of the antenna may be accurately located at all times. These are also essential for erection purposes in building up the antenna parts which are in turn supported by the spacing and supporting beams in precise locations.

With this construction, it is possible to accurately position the antenna from the base up during the period that the plates are applied to the inside and outside of the antenna, and thus to accurately position the plates or panels and to connect them for adjusting movement both automatic and manual as clearly set forth in my foregoing application relating to the fabrication and adjustment of these parts.

Summary of Details

This invention therefore presents a solid surface paraboloidal antenna 30 movable 180° about the horizontal axis 32 from one horizon through zenith to the other horizon and with a slight distance in addition in each direction, with unlimited motion in either rotary direction for the full 360° in azimuth. It may be used as a transmitter and receiver, the antenna dish is 300 feet wide, and it stands approximately 435 feet high. It is supported on anti-friction bearings illustrated and described in some detail in FIG. 13 and is held down about the base by having the hollow ring 50 grounded in the flotation ring 52 and by the engagement by many contact rings 102 about the periphery.

All surface buildings and facilities are carried on shipboard within the structure itself because of the huge size of the structural members and because the bearing is easily capable of supporting additional loads, the structure is not limited to any particular kind of material, but is found best to construct the antenna of aluminum to enclose the main structural portions of the antenna by means of the solid back-up construction and outer plates 148 and 150 so that heat can be applied from the inside to remove ice and to maintain uniform temperature throughout the structure. The base is preferably made of steel and large steel plates, the total moving structure weighing approximately 18,000 tons of which 6,000 tons is above the horizontal axis 32.

Tower and Erection

At the top of the central control tower comprising the legs 36 is the controlling station comprising ample space for including the controlling mechanism which is not shown in detail, and for supporting parts forming the focal point 40 which happens to be within and below the controlling station 38. In erecting the antenna, the tower legs 48, cross beams 66 may be fabricated, the tower legs extending from the ends of the segmental members 80 which are mounted upon the horizontal axis 32 and with the tower legs extending upwardly, the entire antenna may be erected by positioning ordinary bridge type erection derricks directly upon the previously erected portions of the supporting base segments and antenna, the remainder of the antenna being positioned by cranes on top of the towers and bearing trusses.

A 300 foot size antenna involves about 15,000 cubic yards of reinforced concrete, 11,000 tons of structural steel, 2,500 tons of structural aluminum, 2,000 tons of large gears and heavy machinery and a large amount of electronic equipment, and requires about three years for its construction. It is desirable to use high strength weldable magnesium, aluminum alloy, furnished in the non-heat treatable hot rolled temper, economical because the basic stresses for this alloy are equivalent to that of mild structural steels, it weighs only one-third as much, and is desirable from an electronic standpoint because it is non-magnetic and requires practically no maintenance, upkeep or painting.

The Antenna Surface

In accordance with my application previously identified, the surface of the antenna comprises plates of solid aluminum or a honeycomb sandwich type with an aluminum surface material that would be glued to a structural back-up framework of aluminum members, not shown. Both alternates comprise an assembly of 242 pieces plus an outer central plate 148 as shown in FIG. 4 and an inner central plate as 152 (FIG. 27), all pieces being manufactured on precision jigs and then lightly surfaced, machined for fine precision in the shop and shipped in a series of 12 foot wide and 30 feet long pieces for assembly in the field. These pieces are arranged in a series of five complete rings of inner surface elements as shown in FIG. 1. They are arranged with eighteen 20° pie-shaped pieces in the inner ring of surface elements (not shown in detail in this case); thirty-six pieces of 10° each in the second ring; forty-eight pieces of 7½° each in the third ring, sixty pieces of 60° each in the fourth ring, and eighty duplicate 4½° pieces in the outer ring of surface elements so that five precision jigs are required in the manufacturing process of the plates.

Each plate as reported in detail in my previous application, is supported from the end of the previous interior truss plate 232 and then from its own two adjustable screw jacks 190 of FIG. 23 to the support points on the next stringer. They are arranged in this manner so that all segments in each ring are alike, and each ring of segments has a cantilever action beyond its support point to support the inner edge of the next ring of surfacing elements just outside.

In this manner, the deflection of the individual surface element is held to a minimum; there are no cusps or discontinuities in the theoretical curvature of the surface, and the surface adjusting jacks are available for future use if the need arises to adjust local areas for greater precision in certain attitudes. It will be understood that these precision movements are made automatically and in advance because of the sensing rods 192 which causes the operation of the jacks 190 to maintain a perfect geometric structure, and if necessary, to compensate for wind, rain, ice and other weather changes.

Mounting the separate surfacing segments on top of stringers as a series of multiple cantilevered annular rings of surface permits the use of a single continuous stringer like that in the compensated tubular members 188 of the tower struts (FIG. 18) or for each ring of segments and the use of straight beams between all points of support. The supporting stringers are made as a series of 18° cords while the positions on top of the stringers for the jacks follow the true parabolic curvature of the surface.

Thus all of the radial components of stresses that are due to the curvature of the stringers and of the stringer bracing trusses are taken directly at the points of support by bracing reactions of radial trusses at their common intersections. This system gives an extremely rigid series of supports for the surfacing elements in this antenna, while at the same time it is a very practical system to lay out, to fabricate, and to check during the partial and final stages of erection, and each system of members supplements the other.

Rear Antenna Surface

Figure 3:
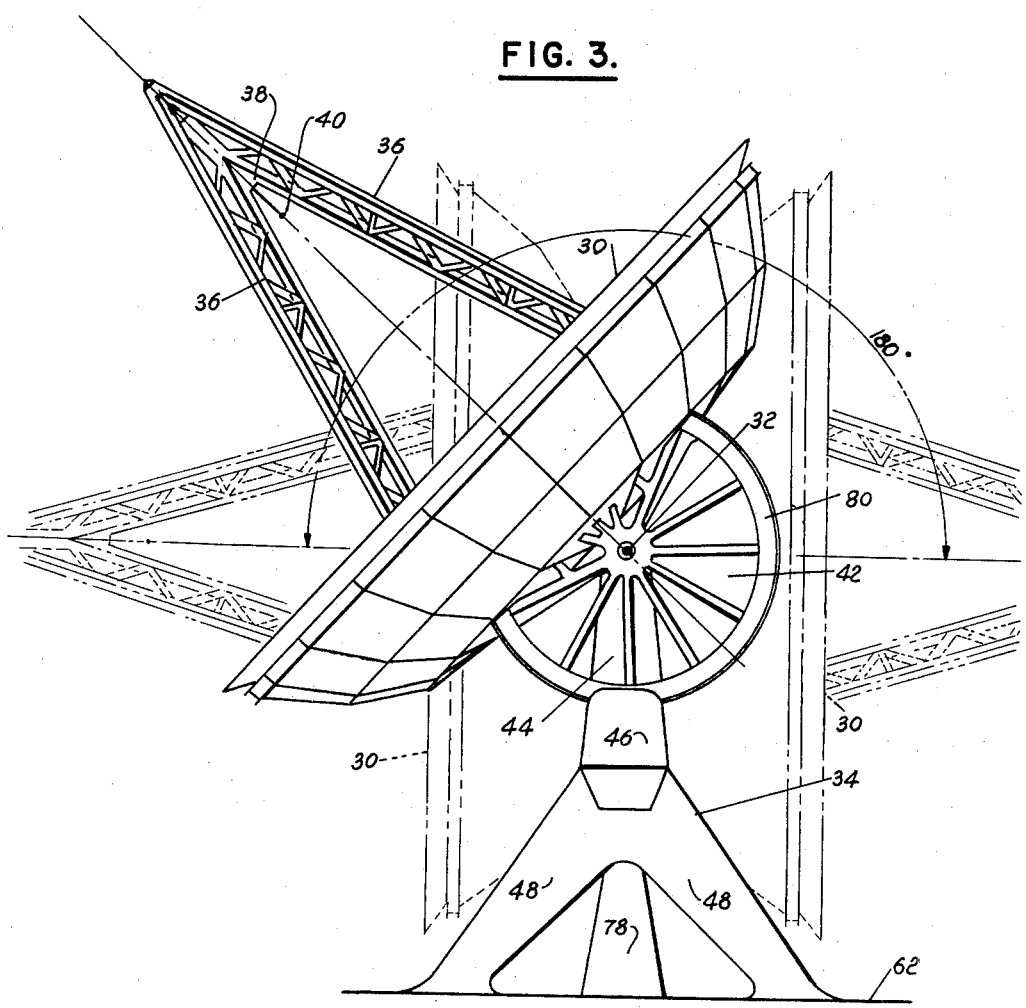
FIG. 3 is a side elevation of the antenna in about the declination angle shown in FIG. 1 illustrating in dotted outlines the limits of its declination movement.

At the rear or back side of the antenna 30 is a second protective surface illustrated in FIGS. 2, 3 and 4 and comprising outer plates 148, 150 and the similar outer rings which enclose all of the supporting elements and the compensating trusses above referred to, so that the interior parts may be kept as nearly as possible at the same temperature which might otherwise cause warping and distortion of the paraboloidal surfaces. The enclosing surface is intended to reduce drag and adverse wind loads on the antenna for survival during high winds and for better operating and weather conditions.

A system of radial trusses and a main ring truss are also provided similarly compensated for length as above described and in accordance with the previous application. The members within these trusses will immediately sense and correct any tendency of the upper and lower portions of the antenna to droop or sag so that the antenna will still be automatically maintained in a parabolic shape when it is aimed at the horizon.

If the outer shell of the antenna stretches as it will on the top side of the antenna, the jacks 190 reacting between the support points through the inside tubular members apply sufficient tension to restore the original length, whereas the jacks on the lower side will automatically be applying compressive forces to correct for deformations that would shorten the lengths of the outer shells. The jacking members must be capable actually of resisting all of the variable force throughout a complete cycle as the antenna moves 180° about the horizontal axis 32.

Balanced Structure

The movable antenna therefore provides a completely rigid structural framework for the support both of the paraboloidal surface and the focal point 40 with eight reactions on the ends of the four segmental bearings 42, each of which has a counterweight 142 (FIG. 13) in place of only two bearings.

The declination from horizontal axis 32 is the center line of the main points of the hubs of the segmental counter weighted bearings 42. The rack pinions 84 (FIG. 7) operate on the gear teeth 82 of the segmental bearings and the balancing counterweights 142 are about the same thickness as the gears to swing free just outside the tower column.

Unbalanced wind loads and accelerating forces are resisted by the main drive pinions 84 as operating rack forces on the rim gear teeth 82. These pinions and gear teeth are strong enough to handle the antenna under all operating conditions including survival during hurricane winds by simply applying the machine brakes. The counterweights 142 are sufficient to balance the center of the mass of the antenna about the horizontal axis 32 and its four large bearings 1, 3 and 6.

The combination of four pinions 84, two on each side of the base extension 46 is believed to be without precedent, is entirely sufficient and takes the place of all other known ways of providing temporary anchorage for the security of antenna in high wind. This engagement with the teeth 82 of the segmental members 80 is of necessity since the ordinary temperature ways are inadequate to cope with the magnitude of the force of a wind which may be 200 miles per hour on an antenna with such a large surface and aperture.

The Tower

In a massive structure of this kind, the supporting tower has legs 48 and a cross beam 66 fabricated of massive plates but providing different partitions, floors and rooms which are sufficient in size to house all the necessary operating and storage parts for the entire structure.

The service elevator 60 or a number of such elevators may be provided for affording access to each floor level and, of course, portholes and enclosed stairways, both of which are not illustrated, are also commonly provided so that some of the floors may be suitable as living quarters for the crew and other workmen.

Azimuth Bearing

The main azimuth bearing may be regarded as a large doughnut shaped barge or hollow ring 50 approximately 280 feet in diameter and 20 feet deep which is floated in the channel or floatation ring 52 so that it may turn about a vertical axis, or in azimuth without displacing any water. The floatation ring or channel is 20 feet deep but requires only 14 feet of water to float the antenna structure and when there are 19 feet of water in the channel, the float is one foot clear of the bottom. It has to be held at the sides by the contact rings 102 at the inner and outer edges of the float ring 50 (FIGS. 5, 6 and 8–12) to retain the required stability necessary. The ring 50 will simply float slightly higher or lower in the floatation ring 52 depending on the temperature of the water and at the same time, the azimuth gear pinions 114 will always be held properly in mesh with teeth of the gear face 106.

Rolling friction forces are thus held to an absolute minimum at all times to enhance precise control of the telescopes. An extremely rugged and high quality bearing is thus provided for supporting tremendous loads with a very small coefficient of friction. The roller tracks formed by the contact supports 88 are made in sections as heavy structural weldments finished with hardened and accurately ground surfaces as a series of angular segments around each full circle. All of the precision machine work is made on the segments in a shop which will be transferred to the floating hollow ring 50 in the field with the ring already bent into its loaded cambered curvature so that only a light final grinding is necessary in the field to make a perfect bearing of this huge size.

Foundations and Driving Gear

The foundations for the azimuth central ring tank 64 provides a storage reservoir for water to be pumped out of the main floatation ring 52 when the antenna is grounded for survival and is returned therefrom for proper floatation.

The main drive may comprise a single ring gear 106 around the outer face of the floatation ring 52 as shown more particularly in FIGS. 5, 6 and 8–12 inclusive, engaged by eight pinions 114 driven by eight or more motors 118 about 90° apart. They are preferably arranged in pairs so that at least two sets of pinions are interconnected in different steps on a pressure demand system for anti-back lash.

This construction also makes it possible to finish the large outer ring gear and to finally machine the tracks which form the top rim edges of the hollow barge ring 50, and of the bearing surface thereof, in situ, by floating and rotating the whole ring past stationary milling heads (not shown), as if it were a huge lathe so that perfect arcuate surfaces may be generated on these huge diameters. This was not possible prior to this construction, and the largest lathe now available are much too small for work of this magnitude.

A number of advantages are set forth in the specification preceding the brief description of the drawings which have been clearly pointed out in the specification above and the following features are clearly defined and distinguished from my prior pending application:

The combination of conical roller bearings with a hydrostatic bearing has large conical gears for the azimuth drive to improve precision controls for rotation in azimuth and offer more precise manufacturing adjustments during construction;

Hydraulic rotor driven bearing screw jacks and other improved means for automatically compensating for structural deformations by means of thermal jacks and other control thermal conditions and worm-driven bronze jack nuts equipped with hydraulic boosters;

Double compensated support points for the alignment and location of a focal axis, and to support a practically unlimited amount of preamplifier and focal equipment;

To provide improvements in adjustable supports for surface elements to achieve better service, precision for improved contact with greater ease of adjustment; to provide new double declination gearing and counterweight assemblies with a single cellular tower column construction between said assemblies to achieve better strength and mobility, to afford greater sky coverage about the altitude axis, and to provide improved pointing accuracy and greater controllability;

Doubled cellular wall tower and girder constructions which make it possible to construct structural members of unprecedented and unlimited size, with greater integrity from relatively thin structural plate components, and with all the interior space unobstructed for use and readily available for occupancy, and for all the service building requirements inside, eliminates the need for separate service structures and thus greatly improving the transmitting and receiving work and facilities for the whole antenna.

While I have thus described a mammoth antenna structure, incorporating in it many details set forth in my previously filed application which are not repeated in this specification, and while I have added certain details of construction in the present application which differ entirely from my original application, they should be regarded as illustrations or examples rather than limitations or restrictions of the invention, since various changes in the construction, combination, and arrangement of the parts may be made without deparing from the spirit and scope of the invention.

I claim:

1. In an antenna, the combination with a rotary azimuth base, means forming a horizontal declination axis on top of the base having aligned but spaced bearings in the axis, a pair of segmental supports rotatable on each bearing, a tower having four legs, two supported by each pair of segmental supports and the four lower ends of the tower legs being in a common plane, the upper ends of the towers inclining inwardly and uniting in a common apex, a parabolic antenna dish extending outwardly from the base of the tower legs and comprising a hollow shell with inner and outer spaced segmental surfaces, means between the surfaces for automatically maintaining the surfaces in a relatively fixed geometrical condition, and means within the towers at their apex extending inwardly and forming the focal axis of the parabolic antenna dish.

2. In an antenna according to claim 1, the segmental supports each having teeth in their outer edge, pinions carried by the base below the axis for engagement of teeth of each of the gears separately to drive them in opposite directions and to rotate the antenna dish about one-half of a diameter.

3. In an antenna according to claim 2, the segmental supports projecting the base of the antenna dish outwardly beyond the declination axis and the upper and lower peripheries of the dish having a spaced relation to the azimuth base such that the antenna dish may be varied in inclination over the top of the declination axis for at least 180° so that it will be effective close to the ground in any rotated azimuth position in addition to the space above the declination axis.

4. In an antenna in accordance with claim 2, a base having end extensions with central bearing supports, each bearing support projecting between each pair of segmental supports, the base extensions including the driving pinions and each of the spaced bearings being supported by one of the said bearing supports to stabilize the antenna dish on its axis and to carry it rotatably upon its segmental supports.

5. In an antenna in accordance with claim 1, the inner and outer segmental surface of the antenna dish comprising a plurality of separate ring surfaces composed of segmental plates, beams within and covered by the plates having trusses for supporting the plate segments of the surfaces, and compensating jacks within the antenna and connected through the beams to the segmental plates for altering them to oppose a change in geometrical structure of the antenna dish, and to maintain the inner surface as a true parabola under all conditions.

6. In an antenna in accordance with claim 1, the azimuth base being of relatively huge proportions and comprising legs and a connecting cross piece each formed with sectional outer plates and inner plates dividing the legs and cross pieces into areas, rooms and apartments arranged upon different floors and levels, and elevator means rotatable with the base extending upwardly at the center thereof through the cross piece and having outlets at the different floors and extending upwardly beyond the cross piece to the declination axis to facilitate access to all of the floors and levels.

7. In an antenna in accordance with claim 1, the means between the surfaces for maintaining the surfaces in a relatively fixed geometrical condition comprising a relatively large tubular member with a relatively smaller tubular member coextensive therewith and inside of the first member, fixed beams connected by the outer tubular member, sensing rod means extending between the beams and a rotary hydraulic jack comprising a closed chamber between the tubular members, a fixed partition in the chamber between the members at one point, a vane connected to the other member to close the chamber and rotatable with respect to the partition, the jack being rotatable in opposite directions to lengthen or contract the distance between the fixed beams and thus to maintain the beams in a fixed geometrical relation, sensing rod means extending between the beams and selective means operated by the sensing rod means for moving the vane of the jack in one direction or the other in the said chamber, depending upon whether the sensing rod calls for a lengthening or shortening of the distance between the beams.

8. In an antenna in accordance with claim 7, the hydraulic jack compensating for increase or decrease of the length for maintaining complete rigidity in the structure at all times, and comprising a compensating system having a first auxiliary compensating system between the beams and a second auxiliary truss system within the first system that operates against the same structural joints and beams as the first system, hydraulic jacks and toggles automatically loaded to compensate for any tendency of deformation in the geometric length between the two beams, and indicating means comprising two compensating shafts each connected at spaced distances apart to one end of a lever, the other end of the lever and a fixed support relative to the other end of the lever is rotated in either direction to indicate whether the geometrical compensation requires a movement of the auxiliary truss system in one direction or in the other direction from a central or zero position.

9. In an antenna, the combination with a supporting tower having four cellular structural legs and a connecting cross piece with the bottoms of the legs spaced about equally apart, a horizontal declination axis having bearings on top of the base, segmental supports carried by each of the bearings, a parabolic antenna dish secured to the ends of the segmental supports, means in connection with the segmental supports and mounted on the base for rotating the antenna dish about the horizontal axis, a ring float to which the lower ends of the tower legs are connected, a floatation ring for containing liquid in which the said ring float is mounted, the floatation chamber comprising inner and outer structural rings connected at the bottom to form a water-tight chamber, means at the upper and inner edge of the ring float and at the upper end of the inner structural ring for pressing downwardly on the inner edge of the ring float, and means at the outer top edge of the ring float and at the top edge of the outer ring structure including pinions, driving motors and gears disposed at an angle to the horizontal for pressing this edge of the ring float downwardly and for the pinions to engage the rack in driving the ring float and the connected tower circularly in azimuth.

10. In an antenna in accordance with claim 9, the combination with water or other floatation liquid in the floatation chamber for raising the ring float above the bottom thereof and in contact with the means at the upper and inner edge of the ring float and in contact with the means at the outer and top edge of the ring float so that the ring float is pressed downwardly by said means, both of said means at the inner and outer edge of the ring float being inclined downwardly and including a plurality of contacts carried by the inner and outer structural rings which maintain contact with the ring float to press and hold it downwardly in the floatation chamber, and the floatation chamber supporting the antenna being grounded at the bottom of the chamber and held stationery in this position for survival of the antenna when a predetermined amount of floatation liquid is removed from the floatation chamber so that the ring float is not supported thereby.

11. In an antenna in accordance with claim 10, the combination with the floatation liquid, of an additional storage chamber for the liquid within the floatation chamber at the center of the antenna sufficient to supply the necessary liquid to the floatation chamber for supporting the ring float therein and having a capacity to receive surplus liquid from the floatation chamber so that the ring float may be grounded therein for protection and survival.

12. In an antenna in accordance with claim 10, the combination with a ring float at the upper inner edge of which is a continuous inclined gear and a separate contact surface, and at intervals on the outer edge of the structural ring are a plurality of inclined shafts each containing a pinion in contact with the said gear and a contact wheel or ring in engagement with the separate contact surface, the said pinions and contact rings being maintained in engagement with their corresponding parts on the ring float so that the ring float may be rotated by the pinions when there is sufficient floatation liquid in the chamber to raise the ring float from the bottom of the chamber, and the contact rings assist in holding the float downwardly when the floatation liquid is sufficient to raise the ring float in the floatation chamber.

13. In an antenna in accordance with claim 12, comprising a central and centering precision bearing attached and integral at the bottom with the additional storage chamber for floatation liquid comprising a reinforced foundation tower and a circular bearing attached to the said cross piece of the said supporting tower to receive and centralize pressures simultaneously of the cross piece, the bottoms of the legs and the floatation ring on which they are mounted and to provide accurate centering for the structural ring and contact rings on their corresponding parts on the ring float.

14. In an antenna in accordance with claim 13, the centering bearing being hollow and providing a vertical space for a hollow shaft extending from below the ground level in which the ring float is mounted to the horizontal declination axis and to provide for an elevator movable therein.

No references cited.